United States Patent
Mita et al.

(10) Patent No.: US 8,805,020 B2
(45) Date of Patent: Aug. 12, 2014

(54) APPARATUS AND METHOD FOR GENERATING DEPTH SIGNAL

(75) Inventors: Takeshi Mita, Yokohama (JP); Nao Mishima, Inagi (JP); Kenichi Shimoyama, Tokyo (JP); Ryusuke Hirai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 629 days.

(21) Appl. No.: 13/052,194

(22) Filed: Mar. 21, 2011

(65) Prior Publication Data
US 2012/0002862 A1    Jan. 5, 2012

(30) Foreign Application Priority Data

Jun. 30, 2010   (JP) ................ 2010-149721

(51) Int. Cl.
| | | |
|---|---|---|
| G06K 9/00 | (2006.01) | |
| G06K 9/46 | (2006.01) | |
| G06K 9/66 | (2006.01) | |
| G06K 9/20 | (2006.01) | |
| G06K 9/36 | (2006.01) | |
| H04N 15/00 | (2006.01) | |
| H04N 13/00 | (2006.01) | |
| G06T 15/00 | (2011.01) | |
| G06T 7/00 | (2006.01) | |
| G06T 7/40 | (2006.01) | |

(52) U.S. Cl.
CPC ............ *G06T 7/0051* (2013.01); *G06T 7/0018* (2013.01); *G06T 7/408* (2013.01); *G06K 9/4642* (2013.01); *G06T 2207/10016* (2013.01); *G06T 2207/10028* (2013.01); *G06T 2207/20021* (2013.01)
USPC ........... 382/106; 382/154; 382/165; 382/195; 382/282; 348/44; 345/419

(58) Field of Classification Search
USPC ......... 382/100, 106–107, 153–154, 181, 190, 382/195, 276, 285; 345/419–427; 348/42–60
See application file for complete search history.

(56) References Cited

U.S. PATENT DOCUMENTS

2004/0051783 A1* 3/2004 Chellappa et al. ............... 348/46
2004/0109585 A1* 6/2004 Tao et al. ....................... 382/106

(Continued)

FOREIGN PATENT DOCUMENTS

| JP | 8-331607 | 12/1996 |
|---|---|---|
| JP | 11-239364 | 8/1999 |

(Continued)

OTHER PUBLICATIONS

Felsberg, Michael, Sinan Kalkan, and Norbert Krüger. "Continuous dimensionality characterization of image structures." Image and Vision Computing 27.6 (2009): 628-636.*

(Continued)

*Primary Examiner* — Randolph I Chu
*Assistant Examiner* — Nathan Bloom
(74) *Attorney, Agent, or Firm* — Finnegan, Henderson, Farabow, Garrett & Dunner, LLP

(57) ABSTRACT

According to one embodiment, a depth signal generating apparatus includes following units. The calculating unit is configured to calculate a statistic value for pixel values for each of predefined areas in the first image, and calculate, for each of predetermined base depth models, a first evaluation value based on the calculated statistic value. The correcting unit is configured to correct, based on a second evaluation value previously derived for the second image and a first degree of similarity indicating a similarity between the predetermined base depth models, the first evaluation value to derive second evaluation values for the predetermined base depth models. The selecting unit is configured to select a base depth model having the highest second evaluation value from the predetermined base depth models. The generating unit is configured to generate a depth signal based on the selected base depth model.

6 Claims, 3 Drawing Sheets

(56) References Cited

U.S. PATENT DOCUMENTS

| | | | |
|---|---|---|---|
| 2007/0018977 A1* | 1/2007 | Niem et al. | 345/422 |
| 2010/0053310 A1* | 3/2010 | Maxson et al. | 348/51 |
| 2010/0315488 A1* | 12/2010 | Kim et al. | 348/46 |
| 2011/0069064 A1* | 3/2011 | Zhang et al. | 345/419 |
| 2011/0249099 A1* | 10/2011 | Vandewalle et al. | 348/47 |
| 2012/0274634 A1* | 11/2012 | Yamada et al. | 345/419 |

FOREIGN PATENT DOCUMENTS

| | | |
|---|---|---|
| JP | 2000-261828 | 9/2000 |
| JP | 2001-359119 | 12/2001 |
| JP | 2004-295859 | 10/2004 |
| JP | 2004-320189 | 11/2004 |
| JP | 2005-151534 | 6/2005 |
| JP | 2007-264722 | 10/2007 |
| JP | 4214527 | 1/2009 |
| JP | 2009-44722 | 2/2009 |

OTHER PUBLICATIONS

Saxena, Ashutosh, Sung H. Chung, and Andrew Y. Ng. "Learning depth from single monocular images." NIPS. vol. 18. 2005.*

First Office Action issued by the Japanese Patent Office in Japanese Patent Application No. 2010-149721, mailed Apr. 17, 2012, and English translation thereof.

Jeong et al., "Depth-Image-Based Rendering (DIBR) Using Disocclusion Area Restoration," SID 09 Digest (2009), pp. 119-122.

Cheng et al., "A Quality-Scalable Depth-Aware Video Processing System," SID 09 Digest (2009), pp. 123-126.

* cited by examiner

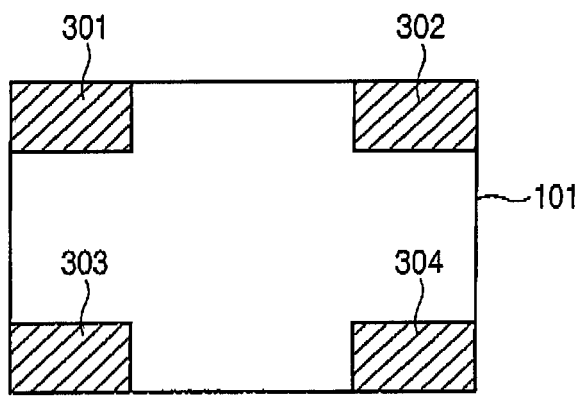
F I G. 3
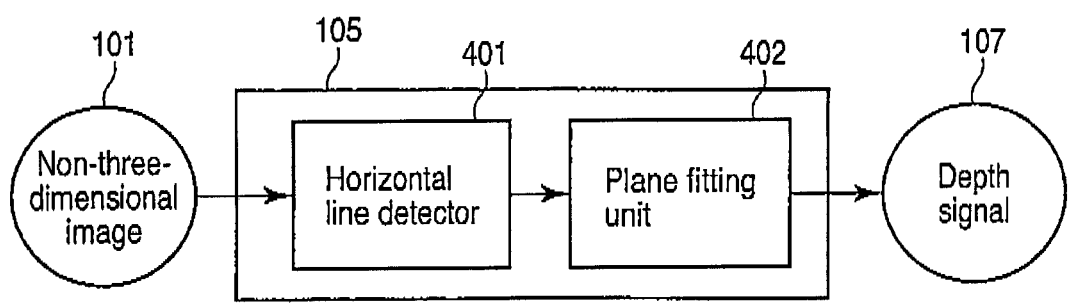
F I G. 4

APPARATUS AND METHOD FOR GENERATING DEPTH SIGNAL

CROSS-REFERENCE TO RELATED APPLICATIONS

This application is based upon and claims the benefit of priority from Japanese Patent Application No. 2010-149721, filed Jun. 30, 2010; the entire contents of which are incorporated herein by reference.

FIELD

Embodiments described herein relate generally to depth signal generating apparatuses and methods which generate a depth signal.

BACKGROUND

To generate a three-dimensional image from a two-dimensional image, there is a method of using a depth signal which is generated by estimating a depth structure of the two-dimensional image. Three-dimensional image generating apparatus using such a method includes a depth signal generating apparatus. For example, the three-dimensional image generating apparatus generates a two-dimensional image of a viewpoint, which is different from a viewpoint at which the input two-dimensional image is obtained, by using a generated depth signal, and generates a three-dimensional image signal including a multi-viewpoint two-dimensional image. A conventional depth signal generating apparatus combines a plurality of depth signals and outputs a combined depth signal. However, when depth signals are combined, contrast of the depth signal deteriorates although rapid change of depth with a lapse of time does not easily occur. As a result, the depth feel and stereoscopic effect of the three-dimensional image displayed on a display device are deteriorated.

BRIEF DESCRIPTION OF THE DRAWINGS

FIG. 3 is a diagram for explaining scene category classification based on a degree of similarity between calculation areas.

FIG. 4 is a functional block diagram showing an example of operation of a generating unit shown in FIG. 1 in the case where the base depth model of FIG. 2A is selected.

DETAILED DESCRIPTION

In general, according to one embodiment, a depth signal generating apparatus includes a calculating unit, a correcting unit, a selecting unit, and a generating unit to generate a depth signal for each of time-series images. The calculating unit is configured to calculate a statistic value for pixel values of pixels for each of predefined areas in the first image, and calculate, for each of predetermined base depth models, a first evaluation value based on the calculated statistic value. Each of the predetermined base depth models has a depth structure pattern. The correcting unit is configured to correct, based on a second evaluation value previously derived for the second image and a first degree of similarity indicating a similarity between the predetermined base depth models, the first evaluation value to derive second evaluation values for the predetermined base depth models. The selecting unit is configured to select a base depth model having a highest second evaluation value, from the predetermined base depth models. The generating unit is configured to generate a depth signal based on the selected base depth model.

Hereinafter, depth signal generating apparatuses according to various embodiments will be described with reference to the accompanying drawings.

Figure 1:
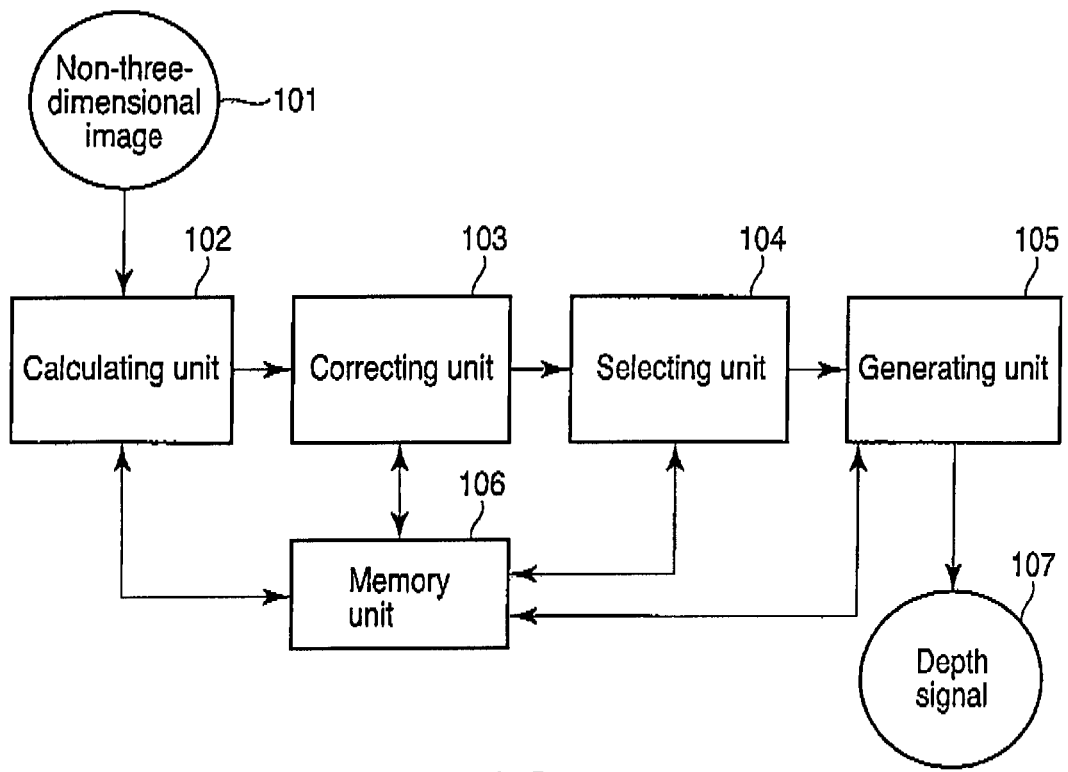
FIG. 1 is a block diagram schematically showing a depth signal generating apparatus according to an embodiment.

FIG. 1 schematically shows a depth signal generating apparatus according to an embodiment. The depth signal generating apparatus includes a calculating unit 102, a correcting unit 103, a selecting unit 104, a generating unit 105, and a memory unit 106.

Figure 2A:
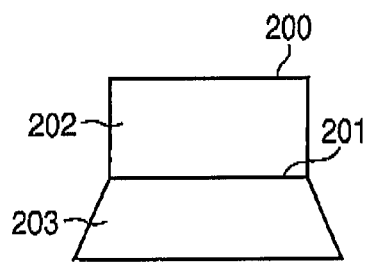
FIGS. 2A, 2B and 2C are schematic diagrams showing each example of base depth models.
Figure 2B:
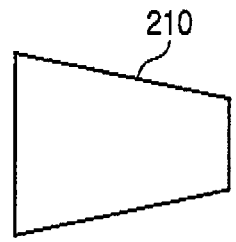
Figure 2C:
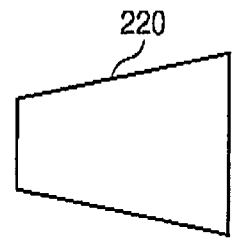

The memory unit 106 stores information relating to a plurality of prepared base depth models (i.e., composition). Each base depth model represents a structural pattern or distribution of depth values in non-three dimensional image such as shown in FIGS. 2A to 2C. Although an example in which input images are time-series non-three-dimensional images is described in the present embodiment, the input images may be images which are formed of parallax images obtained at different viewpoints.

The time-series non-three-dimensional images (for example, two-dimensional images) 101 which are input signals are provided to the calculating unit 102 in, for example, a display order. The calculating unit 102 calculates a first evaluation value to select a base depth model which is most suitable for the received non-three-dimensional image 101 from prepared base depth models. The correcting unit 103 corrects the first evaluation value calculated for the non-three-dimensional image 101 to be processed, by recursively using a second evaluation value obtained from a processed non-three-dimensional image 101 (for example, the previous non-three-dimensional image). A second evaluation value indicates a first evaluation value corrected by the correcting unit 103.

The selecting unit 104 selects a base depth model from the prepared base depth models in the memory unit 106 based on the second evaluation value (i.e., the first evaluation value corrected by the correcting unit 103). The generating unit 105 generates a depth signal based on the selected base depth model. In the embodiment, a depth signal includes a depth value which is calculated for each of pixels included in the non-three-dimensional image 101. Herein, a direction which is vertical to a plane (xy plane) in which pixels of the input two-dimensional image are arranged is set to a depth direction. The generated depth signal can be used for generating a non-three-dimensional image obtained at a viewpoint different from a viewpoint at which the non-three-dimensional image to be processed is obtained, that is, a parallax image.

FIGS. 2A, 2B and 2C schematically show examples of prepared base depth models. FIG. 2A shows a base depth model 200 which has a horizontal line 201. The base depth model 200 corresponds to non-three-dimensional images which have the horizontal line, and includes a plane 202 corresponding to the sky and a plane 203 corresponding to the water surface or the ground.

FIG. 2B shows a base depth model 210 which has a depth increasing from the left side toward the right side therein. FIG. 2C shows a base depth model 220 which has a depth increasing from the right side toward the left side therein, as contrasted with the base depth model 210 of FIG. 2B. The base depth models 210 and 220 correspond to non-threedimensional images obtained by, for example, shooting a wall of a building in an inclined direction.

As an example, explained is briefly processing of generating a depth signal performed, when the base depth model 200 shown in FIG. 2A is selected as a base depth model suitable for the non-three-dimensional image 101 to be processed.

In this example, the horizontal line is detected from the non-three-dimensional image 101, and the non-three-dimensional image 101 is divided into two areas with the detected horizontal line used as the borderline. A high depth value is uniformly assigned to a pixel in an area which corresponds to the sky. The higher depth value indicates the deeper area. For example, a depth value of 0 indicates the front, and a depth value of 100 indicates the deepest part. In addition, a depth value is assigned to a pixel in an area corresponding to the water surface (or the ground) in such a manner that the depth value continuously increases from the bottom of the image toward the horizontal line.

Next, the process of generating a depth signal will be described with reference to FIGS. 1 to 5.

The calculating unit 102 calculates a statistic value for the pixel values of pixels included in a predefined area (also referred to as "calculation area") in the non-three-dimensional image 101 to be processed. The calculation area is a pixel block which includes a plurality of pixels. In the present embodiment, described is an example where partial areas (rectangular pixel blocks) 301 to 304 which are located at four corners of the non-three-dimensional image 101 are set as calculation areas. The method of determining partial areas may be changed as desired. For example, the whole non-three-dimensional image 101 may be used as one calculation area. It is desirable to use a plurality of calculation areas to increase the accuracy of estimating a base depth model suitable for the non-three-dimensional image 101. The number and the positions of the calculation areas are preferably determined in accordance with the types of prepared base depth models. The calculating unit 102 calculates a statistic value for pixel values for each of the calculation areas. As the statistic value for pixel values, it is possible to use a histogram of, for example, colors or texture. The calculating unit 102 calculates a degree of similarity indicating a similarity between the calculation areas based on the calculated statistic value. Then, the calculating unit 102 calculates, for each of the base depth models, a first evaluation value based on the calculated degree of similarity.

In the present embodiment, explained is an example in which a histogram based on RGB color signals is calculated as a statistic value for pixel values in a calculation area and a histogram intersection is used as a degree of similarity, with formulas.

First, the calculating unit 102 quantizes each of RGB color signals into N levels. N denotes a natural number. Quantizing the color signals enables fluctuations of colors due to noise and illumination to be reduced. When a signal of 256 gradation levels is quantized into 8 levels, quantization can be performed in accordance with Formula (1).

$$r = R \!>\!> 5$$

$$g = G \!>\!> 5$$

$$b = B \!>\!> 5 \qquad (1)$$

Where, R, G and B denote pixel values (input signals) of red, green and blue, respectively, and r, g, and b denote quantized pixel values of red, green and blue, respectively. Further, the reference symbol ">>" denotes a bit shift operation. The color histogram includes bins of the third power of the number of bits in the quantized signal, that is, 512 bins. Index i of each bin can be calculated by Formula (2).

$$i = r \times 8 \times 8 + g \times 8 + b \qquad (2)$$

When the color histogram calculated from the calculation area 301 is set to h1(i) and the color histogram calculated from the calculation area 302 is set to h2(i), a degree of similarity s12 indicating a similarity between the calculation area 301 and the calculation area 302 can be defined by a histogram intersection indicated by Formula (3).

$$s12 = \sum_{i=1}^{512} \min(h1(i), h2(i)) \qquad (3)$$

In the same manner, the calculating unit 102 calculates a degree of similarity defined by Formula (3) for each of other combinations of the calculation areas. For example, the calculating unit 102 calculates a degree of similarity s13 between the calculation area 301 and the calculation area 303, a degree of similarity s24 between the calculation area 302 and the calculation area 304, and a degree of similarity s34 between the calculation area 303 and the calculation area 304. As a matter of course, the calculating unit 102 may calculate a degree of similarity s23 between calculation area 302 and the calculation area 303, and a degree of similarity s14 between the calculation area 301 and the calculation area 304, and use them for calculation of the first evaluation value.

Then, the calculating unit 102 generates a feature vector v which includes the calculated degrees of similarity s12, s13, s24 and s34 as indicated by Formula (4). The non-three-dimensional imago 101 to be processed is expressed by the feature vector v.

$$v = (s12, s13, s24, s34) \qquad (4)$$

It is estimated which of the prepared base depth models 200, 210, and 220 the non-three-dimensional image 101 expressed by the feature vector v is close to. As an estimating method, it is possible to use, for example, a support vector machine (SVM) which is often used in pattern recognition. The SVM is a two-class discriminator. In the present embodiment, three SVMs are used to discriminate respective object base depth models from the other base depth models, such as the base depth model 200 from the other base depth models and the base depth model 210 from the other base depth models. The SVMs are learned in advance by collecting a number of sample images corresponding to base depth models. The number of required SVMs depends on the number of prepared base depth models. The calculating unit 102 obtains output values y1, y2, and y3 from the three SVMs as first evaluation values. The first evaluation values are calculated for the respective prepared base depth models. As an example, the output values y1, y2, and y3 correspond to first evaluation values relating to the base depth models 200, 210, and 220, respectively.

With reference to FIG. 2A, FIG. 2B, FIG. 2C, and FIG. 3 together, it is found that the four calculation areas 301, 302, 303 and 304 are set to include a combination of areas which have widely-different depth values in each of the base depth models 200, 210, and 220. Thus, scene category classification can be performed with high accuracy by setting the calculation areas in accordance with the prepared base depth models and estimating degrees of similarity between the calculation areas.

The scene category classification may be performed by using the statistic values for pixel values as feature quantities, without calculating degrees of similarity between calculation areas. However, scene category classification based on degrees of similarity can achieve scene category classification with higher accuracy than scene category classification based on statistic values. For example, in a scene which has the horizontal line 201 such as the base depth model 200 of FIG. 2A, the calculation areas 301 and 302 correspond to the sky and the calculation areas 303 and 304 correspond to the water surface or the ground in many cases. In such a case, it can be easily expected that both the degree of similarity s12 between the calculation areas 301 and 302 and the degree of similarity s34 between the calculation areas 303 and 304 have high values. On the other hand, it can be expected that the degree of similarity s13 between the calculation areas 301 and 303 and the degree of similarity s24 between the calculation areas 302 and 304 have low values.

With a lapse of time, the area of the sky changes in color to sky blue, grey, or sometimes white, the area of the water surface changes in color to blue, and the area of the ground changes in color to green or brown. By using the degrees of similarity between the calculation areas, scene category classification can be stabilized without being influenced by change of areas with a lapse of time.

Next, processing of correcting a first evaluation value performed by the correcting unit 103 will be specifically explained.

The correcting unit 103 corrects the first evaluation values calculated by the calculating unit 102, in consideration of the second evaluation value previously obtained from the processed non-three-dimensional image and the degrees of similarity between the prepared base depth models. Correction of the first evaluation value will be specifically explained hereinafter by using formulas.

In the present embodiment, a non-three-dimensional image for which a depth signal is to be generated is referred to as a non-three-dimensional image of time t. The term "processed non-three-dimensional image" indicates a previous non-three-dimensional image of a time earlier than the time t, for example, a non-three-dimensional image of time t−1. The first evaluation value of base depth model $x_t$ calculated for the non-three-dimensional image of time t is corrected based on a second evaluation value derived for a processed non-three-dimensional image. The second evaluation value $P(x_t|z_1, \ldots, Z_t)$ for the non-three-dimensional image of time t can be defined by Formula (5).

$$P(x_t | z_1, \ldots, z_t) = P(z_t | x_t) \cdot \sum_{x_{t-1}} P(x_t | x_{t-1}) P(x_{t-1} | z_1, \ldots, z_{t-1}) \quad (5)$$

In Formula (5), the symbol $P(z_t|x_t)$ denotes a first evaluation value of base depth model $x_t$ obtained from an image of time t. As an example, the symbol $P(z_t|x_t)$ denotes the output value of the above SVM (or a value obtained by expressing the output value of the SVM by the probability). An index $z_t$ in the first evaluation value $P(z_t|x_t)$ indicates that the first evaluation value $P(z_t|x_t)$ is obtained from an image of time t. If scene category classification is performed by using only the first evaluation value $P(z_t|x_t)$, there is the possibility that a situation occurs in which the selected base depth model is frequently changed with a lapse of time, and consequently change of the depth signal with a lapse of time increases. To avoid such a rapid change of the depth signal, the correcting unit 103 corrects the first evaluation value $P(z_t|x_t)$ by multiplying the first evaluation value $P(z_t|x_t)$ by a correction term indicated by Formula (6), as shown in Formula (5).

$$\sum_{x_{t-1}} P(x_t | x_{t-1}) P(x_{t-1} | z_1, \ldots, z_{t-1}) \quad (6)$$

The symbol $P(x_t|x_{t-1})$ denotes a degree of similarity between base depth models, more specifically, the possibility that the base depth models is changed from base depth model $x_{t-1}$ to base depth model $x_t$ from time t−1 to time t. The symbol $P(x_{t-1}|z_1, \ldots, z_{t-1})$ is a second evaluation value obtained for the non-three-dimensional image of time t−1. The correction term of Formula (6) is a correction term which considers the degree of similarity between base depth models together with the second evaluation value recursively obtained by time t−1, and indicates a correction quantity, that is, how much the first evaluation value for the non-three-dimensional image of time t is to be corrected.

As the degree of similarity $P(x_t|x_{t-1})$ between base depth models, it is possible to utilize a selection rate which is obtained from rates at which the selecting unit 104 selects the respective base depth models when sample images classified according to the base depth models are input and the correcting unit 103 does not correct the first evaluation value. As another example, it is possible to use a selection rate obtained when an SVM discriminator estimates sample images of various base depth models. For example, a matrix which includes elements of a square of the number of base depth models is obtained by calculating a selection rate of each base depth model, such as a possibility that that a sample image which should belong to base depth model A is rightly determined as belonging to base depth model A, and a possibility that a sample image which should belong to base depth model A is erroneously determined as belonging to base depth model B. The matrix indicates an error rate of the SVM discriminator. The possibility that an erroneous base depth model is selected increases as a degree of similarity between the base depth models increases.

As another method of calculating the degree of similarity $P(x_t|x_{t-1})$ between base depth models, it is possible to use a distance between depth signals which correspond to the respective base depth models. For example, the degree of similarity $P(x_t|x_{t-1})$ between base depth models can be defined based on a squared distance D between a depth value $dx_t(j)$ of a j-th pixel in base depth model $x_t$ and a depth value $dx_{t-1}(j)$ of a j-th pixel of in base depth model $x_{t-1}$, as shown in Formulas (7) and (8). The depth values $dx_t(j)$ and $dx_{t-1}(j)$ which are used when the squared distance D is calculated are preset for the prepared base depth models. Specifically, each base depth model has predetermined depth values for respective pixels.

$$P(x_t|x_{t-1}) = \exp(-\alpha D) \quad (7)$$

$$D = \sum_j \sqrt{(d_{x_t}(j) - d_{x_{t-1}}(j))^2} \quad (8)$$

As shown in Formulas (7) and (8), the degree of similarity $P(x_t|x_{t-1})$ between base depth models is defined such that the degree of similarity increases with increased degree of similarity between base depth model $x_t$ and base depth model $x_{t-1}$. Correcting the first evaluation value by multiplying the correction term as denoted by Formula (6) increases the possibility that the same base depth model or similar base depth model is selected in successive non-three-dimensional images. As a result, rapid change of the depth signal is suppressed, and it is possible to generate a depth signal which smoothly changes. The distance can include an absolute value of a difference between the depth value $dx_t(j)$ and the depth value $dx_{t-1}(j)$, or a square of the difference between the values, and a value related to the absolute value or the square.

Next, explained is processing of selecting a base depth model suitable to the non-three-dimensional image to be processed and generating a depth signal.

The selecting unit 104 selects base depth model $x_t$ which has the highest second evaluation value $P(x_t|z_1, \ldots, z_t)$ as shown in Formula (9).

$$\hat{x}_t = \underset{x_t}{\mathrm{argmax}} P(x_t \mid z_1, \ldots, z_t) \tag{9}$$

The generating unit 105 generates a depth signal depending on the selected base depth model $x_t$. The depth signal may be generated by using a standard depth pattern stored in memory unit 106 in advance, or by applying predetermined generation rules to a non-three-dimensional image to be processed. In the method of using a standard depth pattern, a specific depth pattern is applied to the image, that is, a predetermined depth value which the base depth model has is applied to the non-three-dimensional image to be processed. Therefore, the pattern does not always fit the non-three-dimensional image to be processed, and the image may be unnaturally displayed. In the present embodiment, a method of generating a depth signal based on generation rules will be explained with an example of using the base depth model 200 illustrated in FIG. 2.

The base depth model 200 is a base depth model having the horizontal line 201, and the depth is expressed by the two planes 202 and 203 which have the horizontal line 201 as the borderline. FIG. 4 shows components to generate a depth signal when the base depth model 200 is selected as a base depth model suitable for the non-three-dimensional image to be processed. First, a horizontal line detector 401 detects a horizontal line from the non-three-dimensional image 101 to be processed. In the detection of a horizontal line, an edge operator which reacts only to horizontal edges is used to scan the non-three-dimensional image, and edge intensities in pixels are calculated. Next, edge intensities of pixels on each horizontal line of the non-three-dimensional image are added, and a total edge intensity of each line is determined. A line which has the maximum edge intensity is detected as a horizontal line. Next, the plane fitting unit 402 provides parts which are above and below the detected horizontal line with different depth values, according to Formula (10).

$$d(j) = \begin{cases} 100 & \text{if } y(j) < h \\ 100 - y(j) & \text{otherwise} \end{cases} \tag{10}$$

For example, when y(j) of the y coordinate of a j-th pixel is smaller than a detected horizontal line position h (that is, the pixel is located above the position h in the image), that is, when the j-th pixel is a pixel corresponding to the plane 202, the plane fitting unit 402 provides the pixel with a value of 100 which indicates the deepest part as a depth value. The plane fitting unit 402 provides the other pixels (pixels which correspond to the plane 203) with a small depth value in accordance with the value of y(j). Thus, the generating unit 105 generates a depth signal by calculating proper depth values for the respective pixels in accordance with the detected horizontal line position in the non-three-dimensional image to be processed. Since the depth signal is generated based on the selected base depth model, high contrast can be maintained with respect to the depth value.

The depth signal generated by the depth signal generating apparatus of the present embodiment may be used in combination with a depth signal generated by another method. As another method of generating a depth signal, for example, there is an estimation method based on motion parallax, which is described in C. C. Cheng et al., "A Quality-Scalable Depth-Aware Video Processing System," SID, 11.4, 2009. To combine the depth signals, it is possible to use a method of adopting a simple average of the depth signals, or a lower depth value for each of pixels.

Next, the following is an explanation of a method of generating a three-dimensional image by using the depth signal generated by the above process. To obtain a three-dimensional image, a three-dimensional image generating apparatus (not shown) generates a parallax image for the non-three-dimensional image to be processed, on the basis of the depth signal. The parallax image can be obtained by calculating a shift quantity s depending on the depth value d of each pixel. The following is an explanation of a method of calculating the shift quantity s performed in accordance with the simplest geometric model, with reference to the document (Y. J. Jeong et al., "Depth-image-based rendering (DIBR) using disocclusion area restoration", SID, 11.3, 2009).

The depth value d is transformed into shift quantity s according to Formula (11). The symbol b denotes a distance between the eyes of an observer, and v denotes a distance from the observer to a display device.

$$s = \frac{d}{d+v} b \tag{11}$$

The three-dimensional image generating apparatus calculates shift quantity s of Formula (11) for each of the pixels included in the non-three-dimensional image to be processed, and generates a parallax image obtained by shifting each pixel included in the non-three-dimensional image to be processed by the shift quantity s. As an example, the three-dimensional image generating apparatus generates a three-dimensional image signal which includes the non-three-dimensional image to be processed and the generated parallax image as a left-eye image and a right-eye image, respectively.

Figure 5:
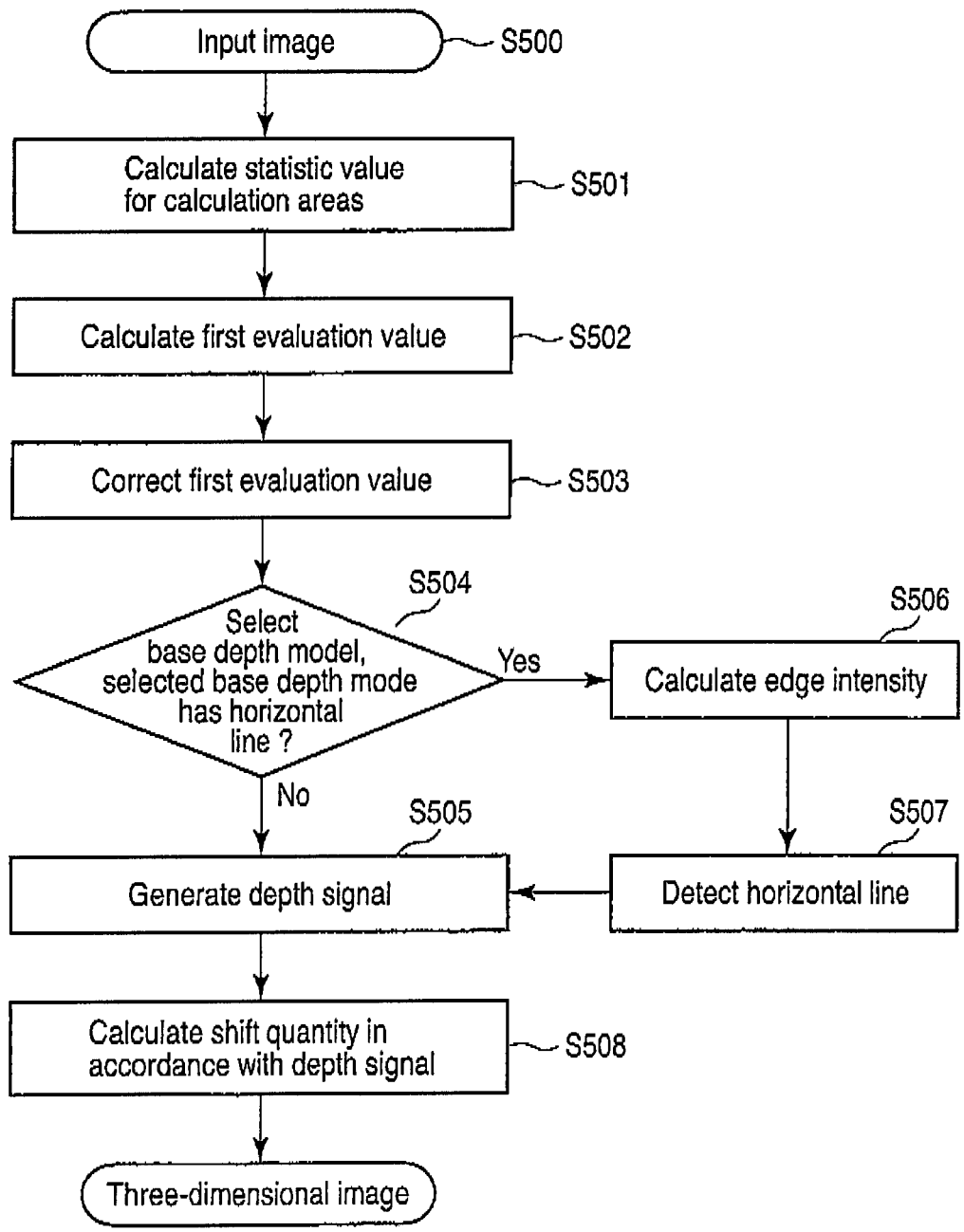
FIG. 5 is a flowchart showing an example of a process by which the depth signal generating apparatus of FIG. 1 generates a depth signal.

FIG. 5 schematically shows a procedure of generating a depth signal. First, in step S500, the calculating unit 102 receives a non-three-dimensional image 101 to be processed. At step S501, the calculating unit 102 calculates statistic values for pixel values for the predetermined calculation areas in the non-three-dimensional image 101. As one example, the statistic value for pixel values is a color histogram and is calculated for each of four corners of the image 101. Next, in step S502, the calculating unit 102 calculates a first evaluation values based on the calculated pixel statistic values for prepared base depth models. For example, a discriminator including support vector machines which have been learned in advance is used for calculation of the first evaluation values.

In step S503, the correcting unit 103 corrects the first evaluation values to generate second evaluation values. Previously-obtained second evaluation values and degrees of similarity between base depth models are used for correction of the first evaluation values.

In step S504, the selecting unit 104 selects a base depth model which has the highest second evaluation value of the second evaluation values, and it is determined whether the selected base depth model is a base depth model having a horizontal line as shown in FIG. 2A. When the selected base depth model has no horizontal line, the process goes to step S505. In step S505, the generating unit 105 generates a depth signal based on the selected base depth model.

If it is determined that the selected base depth model has a horizontal line in step S504, the process goes to step S506. In step S506, the generating unit 105 calculates edge intensities for the pixels in the image 101. In step S507, the horizontal line position is detected based on the calculated edge intensities. In step S505, the generating unit 105 generates a depth signal according to the detected horizontal line position.

In step S508, the three-dimensional image generating apparatus calculates a shift quantity in accordance with the generated depth signal to generate a three-dimensional image signal.

As described above, in the depth signal generating apparatus according to the present embodiment, first evaluation values calculated from a non-three-dimensional image for which a depth signal is to be generated is corrected by using second evaluation values of a processed non-three-dimensional image, suppressing frequent change of a base depth model which is selected as a base depth model suitable for the non-three-dimensional image. Thus, rapid change of the depth signal can be suppressed. In addition, since a base depth model which is suitable for the non-three-dimensional image to be processed is selected from prepared base depth models and a depth signal is generated based on the selected base depth model, the generated depth signal maintains high contrast.

According to the at least one of the embodiments, it is possible to provide a depth signal generating apparatus which generates a depth signal with rapid change with a lapse of time suppressed, while high contrast is maintained in respect to the depth value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for generating a depth signal for each of time-series images, the time series images including a first image and a second image, the apparatus comprising:
    a calculating unit configured to calculate a statistic value for pixel values of pixels for each of predefined areas in the first image, and calculate first evaluation values, respectively for predetermined base depth models, based on the calculated statistic value, wherein each of the predetermined base depth models has a depth structure pattern;
    a correcting unit configured to derive subsequent second evaluation values for the predetermined base depth models by correcting the first evaluation values for each of the predetermined base models, based on a set of second evaluation values previously derived for the second image and a first degree of similarity indicating a similarity between the predetermined base depth models;
    a selecting unit configured to select a base depth model for the first image having a highest second evaluation value for the first image, from the predetermined base depth models; and
    a generating unit configured to generate a depth signal based on the selected base depth model.

2. The apparatus according to claim 1, wherein when time-series images classified according to the base depth models are input, the calculating unit calculates the first degree of similarity based on selection rates at which the selecting unit selects each of the base depth models without using the correcting unit.

3. The apparatus according to claim 1, wherein the calculating unit calculates the first degree of similarity based on a distance between depth signals of the base depth models.

4. The apparatus according to claim 1, wherein the calculating unit calculates a second degree of similarity indicating a similarity between the predefined areas by comparing the calculated statistic values, and a calculates a first evaluation value based on the second degree of similarity.

5. The apparatus according to claim 4, wherein the calculating unit sets the predefined areas such that the predefined areas in each of the base depth models include a combination of areas having different depths.

6. A method for generating a depth signal for each of time-series images, the time series images including a first image and a second image, the method comprising:
    calculating a statistic value for pixel values of pixels for each of predefined areas in the first image;
    calculating first evaluation values, respectively for predetermined base depth models, based on the calculated statistic value, wherein each of the predetermined base depth models having a depth structure pattern;
    correcting, based on a set of second evaluation values previously derived for the second image and a first degree of similarity indicating a similarity between the predetermined base depth models, the first evaluation values for the predetermined base depth models;
    selecting a base depth model for the first image having a highest second evaluation value for the first image of the second evaluation values from the predetermined base depth models; and
    generating a depth signal based on the selected base depth model.

* * * * *